Jan. 31, 1928.
W. M. JORDAN
FISH BAIT
Original Filed April 15, 1924
1,657,966
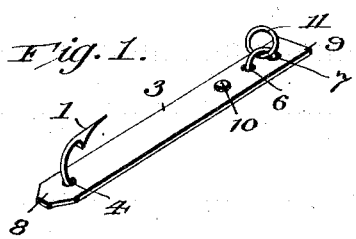
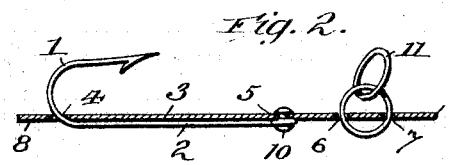
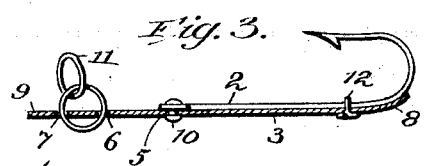
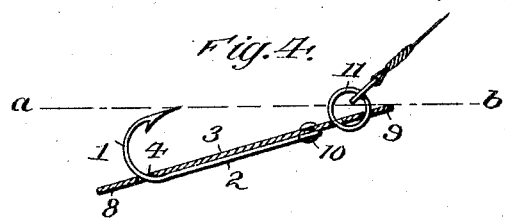
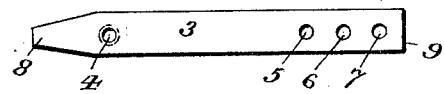
Inventor:
William M. Jordan,
by Dodge and Sons,
Attorneys.

Patented Jan. 31, 1928.

1,657,966

UNITED STATES PATENT OFFICE.

WILLIAM M. JORDAN, OF MIAMI BEACH, FLORIDA.

FISH BAIT.

Original application filed April 15, 1924, Serial No. 706,759. Divided and this application filed July 9, 1926. Serial No. 121,440.

This invention pertains to an artificial lure for taking game fish. The lure is adaptable to fly-casting, casting from the reel, and trolling.

The effect that is sought to be obtained by the design of any fish lure is life-like motion in the water. In all of the various designs that have come to my attention, this object has been attained by clever use of the principle of the inclined plane.

In the design of the present lure this principle plays no part, but the structure is such that it swings from side to side about a fixed axis extending in a straight line from the point of the hook to the forward end of the lure, these two points being always uppermost, and the result being a motion that is very life-like in character.

Various forms of the structure embodying the principle of my invention are illustrated in the annexed drawing, wherein:

Figure 1 is a perspective view of the lure,

Figure 2 is a sectional elevation of the usual form,

Figure 3 is a modification,

Figure 4 is a side elevation to show the position assumed by the lure when drawn through the water, with reference to its axis of oscillation, on the line a—b, and Figure 5 is a plan view of the body or plate employed in conjunction with the hook to produce the lure.

The main object of the present invention is to provide a lure possessing specific, characteristic movements not obtained with any other design, and light enough to be cast with the fly-rod, as well as with the short casting-rod and reel. The small rotary spinner has heretofore been relied upon almost exclusively for providing the element of motility to a fly-rod bait, other forms being too heavy. The present invention supplies a lure which is just as easy to cast with the fly-rod as the small spinner is, and which has the advantage of more life-like appearance and larger apparent size, and the further advantage that the point of the hook is always above the horizontal if the bait is properly balanced. One essential difference is that whereas the spinner turns completely around on its axis, this device turns only part of the way.

The point of the hook being always above the horizontal results in the fish being hooked in the upper jaw, a point of manifest advantage in securing the fish, and also of advantage in that should the fish get away, it would not be seriously injured, or if securely hooked and below the legal size it may be readily detached and returned to the water without the injury of any of the parts which might be fatal to the continued life of the fish.

Referring to the drawings, 1 denotes the lower curved and barbed end of the hook, and 2 the shank thereof, which is provided at its end with the usual eye. The hook is secured to a plate 3, preferably formed of thin sheet metal, and relatively long as compared to its width. It is provided with an opening 4 adjacent one end, and with three other openings 5, 6 and 7 adjacent the opposite end. The opening 4 is beveled, and through it the point of the hook is threaded. The eye of the hook is brought opposite the opening 5 and fixed by a rivet 10 passed through the eye of the hook and the opening 5. The shank of the hook now lies close to the plate, the curved and barbed end lying in a plane perpendicular to the plate. The openings 6 and 7, adjacent the forward end of the plate, are to receive a small ring, or link of chain. The lower end 8 of the plate extends very slightly beyond the opening 4, the opposite end 9 extends slightly forward of the opening 7. It is not necessary to bend either of the ends in order to get perfect motility. In the usual form the lower end 8 is so short that it is immaterial whether it is bent or not, and the opposite end 9 is left straight because there is nothing to gain by bending it. However, the ends may be bent slightly either upwards or downwards, and in the same or opposite directions, without seriously disturbing the specific movement of the lure. If bent too much the movement is hampered. It is sometimes an advantage to bend the forward end down to reduce the amplitude of the vibrations, and where very light material is used for the plate, such as thin aluminum sheets. This particular construction is not, however, set forth and claimed herein as it forms the basis of my original application Serial No. 706,759, filed April 15, 1924 of which this application is a division.

The proximal or near end 9 may have its corners rounded or cut. The opposite end 8 has its corners cut more deeply, making it more pointed at the end. Any suitable means for attaching the line may be employed that will give complete freedom of movement between the attached end of the line and the lure. Two or three links of small chain 11 answer the purpose very well.

Figure 3 shows a modification. In this instance the body or shank of the hook overlies the plate and is secured thereto by a rivet 10 which passes through the eye of the hook, and by a split rivet or cotter pin 12 which embraces the shank and passes through the plate. This method is best adapted to the heavier forms carrying two or more hooks in tandem, intended for use in trolling and in casting from the reel.

Figure 4 illustrates the axis, a—b, about which the lure oscillates. a—b is a straight line which extends from the point of the hook to the opposite end of the lure. In use, the lure, in being drawn through the water, assumes the position shown in Figure 4, that is to say, the barbed end of the hook and the forward end of the plate lie in substantially the same plane as the line to which the lure is attached. The lure will ride through the water in this position oscillating about an axis as a—b; the body of the plate and the shank of the hook swinging from side to side while the point of the hook and the forward end of the plate remain substantially stationary in so far as any swinging movement is concerned.

In all the forms it will be noted that the shank of the hook lies close to and adjacent the plate, and that the plate and the hook are held together in such a way that there is no relative movement between the parts.

Having thus described my invention, what I claim is:

1. In a fish lure, the combination of a plate relatively long as compared to its width and substantially flat in cross-section with at least the major portion of the body of the plate lying in a common plane, and a fish hook rigidly secured to the plate, the bowed and barbed end of the hook extending upwardly from the plate at right angles thereto adjacent one end thereof with the shank of the hook lying close to the body of the plate.

2. In a fish lure, the combination of a flat plate, relatively long as compared to its width, having one end bent upwards; and a fish hook rigidly secured to the plate, the bowed portion thereof extending upwardly adjacent said upwardly bent end with the shank of the hook lying close to the body of the plate.

3. In a fish lure, the combination of a flat plate having at least one end bent laterally out of the plane of the body, said plate being relatively long as compared to its width; and a fish hook rigidly secured to the plate, with the shank of the hook lying close to the body of the plate.

4. In a fish lure, the combination of a plate, relatively long as compared to its width, without concavity in either transverse or longitudinal direction, with straight, parallel sides; a fish hook rigidly secured to the plate, the bowed and barbed end of the hook extending upwardly from the plate at right angles thereto adjacent one end thereof, with the shank of the hook lying close to the body of the plate; and means for the attachment of a line provided on the body of the lure at a point adjacent the forward or upper end thereof, but well below the end, and on that surface of the plate which looks towards the bowed or curved portion of the hook.

In testimony whereof I have signed my name to this specification.

WILLIAM M. JORDAN.